United States Patent
Zhou et al.

(10) Patent No.: US 12,092,784 B2
(45) Date of Patent: Sep. 17, 2024

(54) MULTI-LINE SOURCE GROUND-BOREHOLE TRANSIENT ELECTROMAGNETIC DETECTION METHOD AND MULTI-LINE SOURCE GROUND-BOREHOLE TRANSIENT ELECTROMAGNETIC DETECTION

(71) Applicant: Institute of Geology and Geophysics, Chinese Academy of Sciences, Beijing (CN)

(72) Inventors: Nannan Zhou, Beijing (CN); Guoqiang Xue, Beijing (CN); Weiying Chen, Beijing (CN); Shun Zhang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 108 days.

(21) Appl. No.: 17/887,572

(22) Filed: Aug. 15, 2022

(65) Prior Publication Data
US 2022/0390640 A1  Dec. 8, 2022

Related U.S. Application Data

(63) Continuation of application No. PCT/CN2021/089125, filed on Apr. 23, 2021.

(30) Foreign Application Priority Data
Mar. 15, 2021 (CN) .......................... 202110274854.9

(51) Int. Cl.
   G01V 3/08  (2006.01)
   G01V 3/38  (2006.01)

(52) U.S. Cl.
   CPC ................ *G01V 3/081* (2013.01); *G01V 3/38* (2013.01)

(58) Field of Classification Search
   CPC .................................. G01V 3/081; G01V 3/38
   See application file for complete search history.

(56) References Cited

U.S. PATENT DOCUMENTS

| | | | |
|---|---|---|---|
| 6,388,947 B1 * | 5/2002 | Washbourne | G01V 1/42 367/73 |
| 2014/0012505 A1 * | 1/2014 | Smith | G01V 3/12 702/2 |

FOREIGN PATENT DOCUMENTS

| | | | |
|---|---|---|---|
| CN | 107015286 A | | 8/2017 |
| CN | 109100808 A | * | 12/2018 |

(Continued)

OTHER PUBLICATIONS

Chang et al. (Diffusion Law of Whole-Space Transient Electromagnetic Field Generated by the Underground Magnetic Source and Its Application, IEEE Access, May 15, 2019 (Year: 2019).*

*Primary Examiner* — Rehana Perveen
*Assistant Examiner* — Cuong V Luu
(74) *Attorney, Agent, or Firm* — Pilloff Passino & Cosenza LLP; Rachel K. Pilloff; Sean A. Passino

(57) ABSTRACT

Disclosed are a multi-line source ground-borehole transient electromagnetic detection method and a multi-line source ground-borehole transient electromagnetic detection device. The method includes following steps: S1, constructing a multi-line source ground-borehole transient electromagnetic forward model; S2, obtaining multi-line source ground-borehole transient electromagnetic responses of an underground target layer by the multi-line source ground-borehole transient electromagnetic forward model; and S3, recognizing the underground target layer according to electromagnetic diffusion characteristics of the multi-line source (Continued)

ground-borehole transient electromagnetic responses. A resolution and a detection capability of the underground target by a ground-borehole transient electromagnetic method is greatly improved by adopting technical schemes.

4 Claims, 21 Drawing Sheets

(56) References Cited

FOREIGN PATENT DOCUMENTS

| | | | | |
|---|---|---|---|---|
| CN | 109343130 A | | 2/2019 | |
| CN | 109209354 B | * | 11/2019 | ........... E21B 47/122 |
| CN | 110673218 A | | 1/2020 | |
| CN | 111337988 A | * | 6/2020 | |
| CN | 112327367 A | | 2/2021 | |
| WO | 2011/008707 A2 | | 1/2011 | |
| WO | 2014/077721 A1 | | 5/2014 | |

* cited by examiner

MULTI-LINE SOURCE GROUND-BOREHOLE TRANSIENT ELECTROMAGNETIC DETECTION METHOD AND MULTI-LINE SOURCE GROUND-BOREHOLE TRANSIENT ELECTROMAGNETIC DETECTION

CROSS-REFERENCE TO RELATED APPLICATIONS

This application claims priority to Chinese Patent Application No. 202110274854.9, filed on Mar. 15, 2021, the contents of which are hereby incorporated by reference.

TECHNICAL FIELD

The application belongs to the technical field of resource detection, and in particular to a multi-line source ground-borehole transient electromagnetic detection method and a multi-line source ground-borehole transient electromagnetic detection device for metal mineral resources and geothermal resources.

BACKGROUND

A transient electromagnetic method (TEM) is separable in time. When an excitation field source is turned off, a pure secondary field is observed, and a coupling between an observed signal and an underground electrical structure is better than other methods. The TEM is widely used in fields of coalfield hydrogeology, metal minerals, geothermal and engineering survey. However, limited by a basic principle of electromagnetic diffusion, data collected on a ground is a comprehensive feedback of geological information in a certain depth range. Therefore, a resolution of an electromagnetic method decreases with an increase of a detection depth. The closer to a detection target, the more truly the observed information represents an actual geological structure, and a detection accuracy is not reduced due to an effect by the diffusion.

The excitation field sources used in ground-borehole transient electromagnetic mainly include a magnetic source (a loop source) and an electrical source (a grounding conductor source). These excitation field sources are consistent with emission sources of surface electromagnetic methods. A magnetic source method uses the loop source to excite an electromagnetic field on the ground, and magnetic field components are observed in a borehole. The electrical source uses a long grounding conductor to excite the electromagnetic field underground. The main observed components are a vertical magnetic field and a horizontal magnetic field. The magnetic fields are sensitive to good conductors, and due to an influence of a side effect, an electromagnetic field response shows a certain indication to a detection target layer.

Whether it is a large loop source TEM or a grounding conductor source TEM, a best understanding of a difference between the two sources may be analyzed by describing a transverse electric (TE)-transverse magnetic (TM) dual polarization mode of the electromagnetic field.

The loop source TEM only produces a horizontal current, and the excited electromagnetic field only contains a transverse electric polarization field, is only sensitive to good conduction targets and has a poor resolution to high resistance targets. The conductor source of the grounding conductor source only generates the horizontal current, while a grounding term generates the horizontal current and a vertical current underground. The excited electromagnetic field includes a transverse magnetic polarization field and a transverse electric polarization field. The magnetic field components are generally observed by a ground-borehole TEM. The vertical magnetic field (Hz) is the transverse electric polarization field, and the horizontal magnetic field (Hx, Hy) is a mixed field of the transverse electric polarization field and the transverse magnetic polarization field, so a detection capability of the TEM for a high resistance body is improved to some extent. However, the resolution of the TEM is still limited, which is related to a fact that the transverse electric polarization field dominates the horizontal magnetic field.

The resolution of the transverse magnetic polarization field to the high resistance body is far better than that of the transverse electric polarization field. In order to take advantage of a sensitivity of the transverse magnetic polarization field to high resistance, the transverse electric polarization field needs to be removed. This process may be analyzed, but it is difficult to extract the actual data. Therefore, the conventional large loop source TEM and grounding conductor source TEM are detection methods based on a transverse electric polarization field observation, thus restricting the resolution of the TEM to the high resistance body.

SUMMARY

A technical objective of the application is to provide a multi-line source ground-borehole transient electromagnetic detection method and a multi-line source ground-borehole transient electromagnetic detection device, so as to greatly improve a resolution and a detection capability of an underground target by a ground-borehole transient electromagnetic method.

To achieve the above objective, the application adopts following technical schemes:

the multi-line source ground-borehole transient electromagnetic detection method includes following steps:

S1, constructing a multi-line source ground-borehole transient electromagnetic forward model;

S2, obtaining multi-line source ground-borehole transient electromagnetic responses of an underground target layer by the multi-line source ground-borehole transient electromagnetic forward model; and S3, recognizing the underground target layer according to electromagnetic diffusion characteristics of the multi-line source ground-borehole transient electromagnetic responses.

Optionally, the S1 is specifically as follows:

when an electromagnetic field is excited in a layered earth surface and received in a borehole, an electromagnetic field component excited by a single grounding conductor source in an x-direction is expressed as follows:

$$E_x = -\frac{\hat{z}_0 I}{4\pi}\int_{-L}^{L}\int_0^\infty (1+r_{TE})\frac{\lambda}{u_0}e^{u_0 z}J_0(\lambda r)d\lambda dx' - \frac{I}{4\pi}\left[\frac{x}{r}\int_0^\infty\left[(1-r_{TM})\frac{u_0}{\hat{y}_0}-(1+r_{TE})\frac{\hat{z}_0}{u_0}\right]e^{u_0 z}J_1(\lambda r)d\lambda\right]_{R_1}^{R_2} \tag{1}$$

$$E_y = -\frac{I}{4\pi}\left[\frac{y}{r}\int_0^\infty\left[(1-r_{TM})\frac{u_0}{\hat{y}_0}-(1+r_{TE})\frac{\hat{z}_0}{u_0}\right]e^{u_0 z}J_1(\lambda r)d\lambda\right]_{R_1}^{R_2}$$

-continued $$E_z = -\frac{I}{4\pi} \left[ \int_0^\infty (1-r_{TM}) \frac{\lambda}{u_0} e^{u_0 z} J_0(\lambda r) d\lambda \right]_{R_1}^{R_2}$$

$$H_x = -\frac{I}{4\pi} \frac{y}{r} \int_0^\infty (r_{TM} + r_{TE}) e^{u_0 z} J_1(\lambda r) d\lambda \, |_{R_1}^{R_2}$$

$$H_y = -\frac{I}{4\pi} \frac{x}{r} \int_0^\infty (r_{TM} + r_{TE}) e^{u_0 z} J_1(\lambda r) d\lambda \, |_{R_1}^{R_2}$$

$$-\frac{I}{4\pi} \int_{-L}^{L} \int_0^\infty (1 - r_{TE}) e^{u_0 z} \lambda J_0(\lambda r) d\lambda dx'$$

$$H_z = \frac{I}{4\pi} \int_{-L}^{L} \frac{y}{r} \int_0^\infty (1 + r_{TE}) e^{u_0 z} \frac{\lambda^2}{u_0} J_1(\lambda r) d\lambda dx',$$

where, $J_1(\lambda r)$ and $J_0(\lambda r)$ are first-order and zero-order Bessel functions, respectively, $\lambda$ represents a horizontal wave number, $r_i$ represents receiving and sending distances of measuring points in coordinate systems to which different line sources belong; $h_j$ represents a thickness of a j-th layer; $\hat{z}_j$ represents an impedance of the j-th layer, $\hat{y}_j$ represents an admittance of the j-th layer, and z represents a height of a receiving point;

$$r_{TE} = \frac{Y_0 - \hat{Y}_1}{Y_0 + \hat{Y}_1}$$

indicates a reflection coefficient of an electromagnetic wave when an electric field component is incident on a plane, $$r_{TM} = \frac{Z_0 - \hat{Z}_1}{Z_0 + \hat{Z}_1}$$

indicates the reflection coefficient of the electromagnetic wave when a vertical magnetic field is incident on the plane, $$Y_0 = \frac{u_0}{\hat{z}_0}$$

indicates an intrinsic admittance of a free space, $\hat{Y}_1$ indicates a surface admittance, $$Z_0 = \frac{u_0}{\hat{y}_0}$$

indicates an intrinsic impedance of the free space, and $\hat{Z}_1$ indicates a surface impedance, where $\hat{z}_0 = i\omega\mu_0$ and $\hat{y}_0 = i\omega\varepsilon_0$; $\omega$ represents an angular frequency, i represents a complex number, $\varepsilon_0$ represents a dielectric coefficient of an underground uniform half space, and $\mu_0$ represents a magnetic permeability of the underground uniform half space;

for a multi-line source ground-borehole transient electromagnetic field, z is positive; z is equal to 0 when observed on the ground, but negative when observed in the air; a solution of the responses is obtained by a superposition calculation of the responses of various line sources.

Optionally, in the S2, the multi-line source ground-borehole transient electromagnetic responses in the underground target layer are obtained by designing following parameters: eight line sources are set, an included angle between adjacent line sources is 45 degrees, a length of each line source is set to 500 meters, an emission current is 10 A, and depths of receiving points are 100, 200, 300, 400 and 500 meters respectively.

Optionally, in the S1, a coordinate system is established with each line source as the x axis and a midpoint of each line source as a source point;

for the same measuring point $P(x_1, y_1)$, coordinates in different coordinate systems are obtained by relationships between translations and rotations of the coordinate systems;

(c) when the coordinate system $X_1OY_1$ is translated to X'O'Y', the coordinates are:

$$x' = x_1 + a$$

$$y' = y_1 + b,$$

where $a = L - L\cos\theta_i$, $b = L\sin\theta_i$;

(d) when the coordinate system X'O'Y' is rotated to the coordinate system $X_iO'Y_i$ to which the i-th source belongs:

$$x_i = x' \cos\theta_i - y' \sin\theta_i$$

$$y_i = y' \cos\theta_i + x' \sin\theta_i,$$

each component of the magnetic field generated by a multi-line source excitation is obtained by a superposition.

Optionally, in the S3, a resolution and a recognition capability of an underground high resistance layer are judged by analyzing response diffusion properties of the underground target layer.

The application also provides a multi-line source ground-borehole transient electromagnetic detection device, which includes:

a construction module for constructing the multi-line source ground-borehole transient electromagnetic forward model;

an analysis module for obtaining the multi-line source ground-borehole transient electromagnetic responses of the underground target layer through the multi-line source ground-borehole transient electromagnetic forward model; and a recognition module for recognizing the underground target layer according to electromagnetic diffusion characteristics of the multi-line source ground-borehole transient electromagnetic responses.

The application aims at a fine detection of metal mineral resources and geothermal resources. In a conventional ground detection, an observation position is far away from an underground target, so it is impossible to realize the fine detection of underground three-dimensional ore bodies and ore-forming rock bodies. The conventional ground-borehole transient electromagnetic method based on a transverse electric field is only sensitive to low resistance targets, and has a limited resolution for the ore bodies, the ore-forming rock bodies and ore-controlling structures without low resistance characteristics. The application greatly improves the resolution and the detection capability of the underground target of the ground-borehole transient electromagnetic method.

BRIEF DESCRIPTION OF THE DRAWINGS

Here some specific embodiments of the present application are described in detail by way of example and not limitation with reference to the accompanying drawings. Same reference numerals in the drawings indicate the same or similar parts. Those skilled in the art should understand that these drawings are not necessarily drawn to scale.

FIGS. 4a-4f are schematic diagrams of response plane distributions (1 ms) at 200 m depth, in which, FIG. 4a is a schematic diagram of a horizontal electric field component distribution in an x direction;

FIG. 4b is a schematic diagram of the horizontal electric field component distribution in a y direction;

FIG. 4c is a schematic diagram of a vertical electric field component distribution in a z direction;

FIG. 4d is a schematic diagram of a horizontal magnetic field component distribution in the x direction;

FIG. 4e is a schematic diagram of the horizontal magnetic field component distribution in the y direction; and FIG. 4f is a schematic diagram of a vertical magnetic field component distribution in the z direction.

FIGS. 5a-5d are Ex response diffusion diagrams, in which,

FIG. 5a is a schematic diagram of the response diffusion at 1E-5s;

FIG. 5b is a schematic diagram of the response diffusion at 1E-4s;

FIG. 5c is a schematic diagram of the response diffusion at 1E-3s; and

FIG. 5e is a schematic diagram of the response diffusion at 1E-2s.

FIGS. 6a-6d are Ey response diffusion diagrams, in which,

FIG. 6a is a schematic diagram of the response diffusion at 1E-5s;

FIG. 6b is a schematic diagram of the response diffusion at 1E-4s;

FIG. 6c is a schematic diagram of the response diffusion at 1E-3s; and

FIG. 6d is a schematic diagram of the response diffusion at 1E-2s.

FIGS. 7a-7d are Ez response diffusion diagrams, in which,

FIG. 7a is a schematic diagram of the response diffusion at 1E-5s;

FIG. 7b is a schematic diagram of the response diffusion at 1E-4s;

FIG. 7c is a schematic diagram of the response diffusion at 1E-3s; and

FIG. 7d is a schematic diagram of the response diffusion at 1E-2s.

DETAILED DESCRIPTION OF THE EMBODIMENTS

In order to make a purpose, technical schemes and advantages of the application clearer, the application is described in detail below with reference to the attached drawings.

Figure 1:
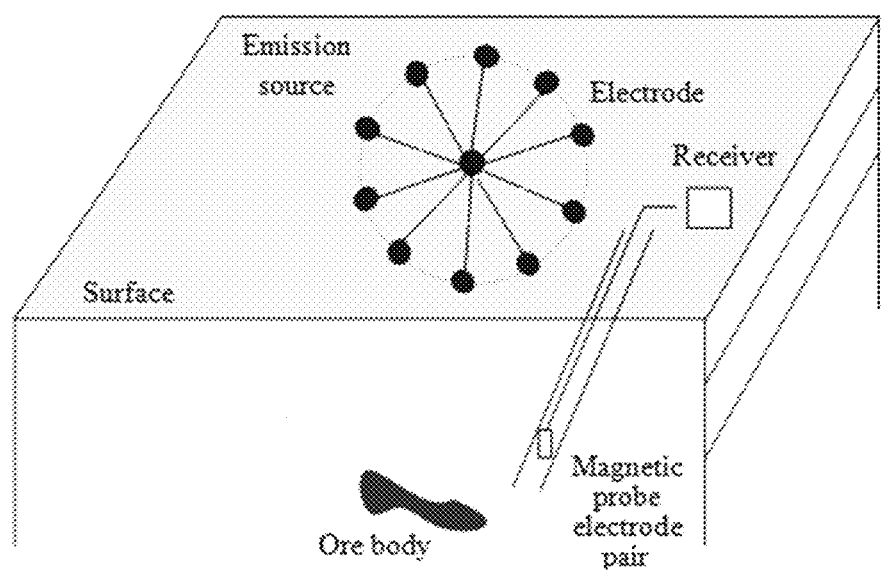
FIG. 1 is a structural diagram of an emission source device.
Figure 2:
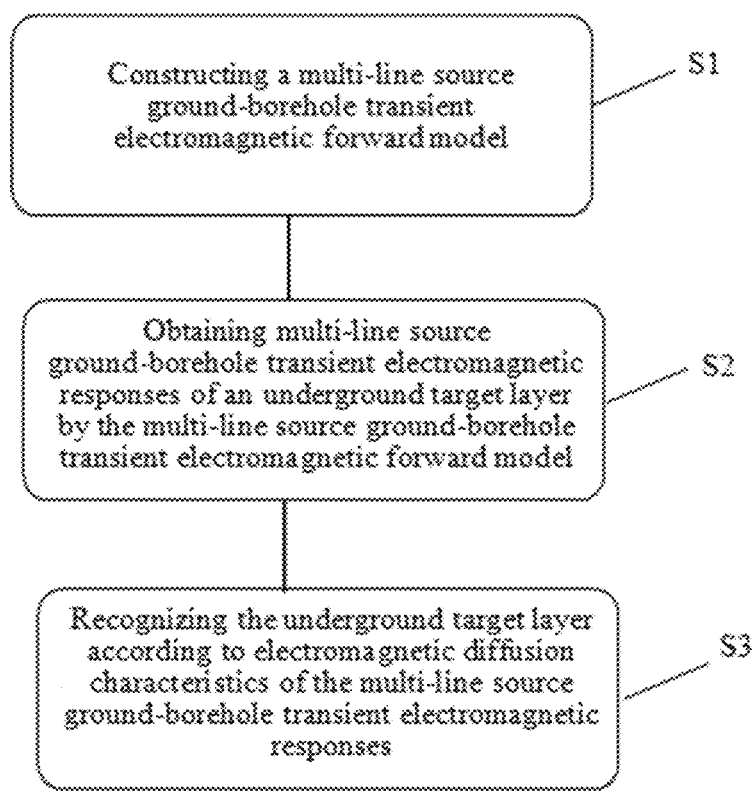
FIG. 2 is a flowchart of a method according to the application.

As shown in FIG. 1, the application provides a multi-line source ground-borehole transient electromagnetic detection method, which is based on a multi-line ground-borehole transient electromagnetic method (MGBTEM). A ground emitting source is composed of multiple groups of grounding line sources which emit currents in opposite directions, and may be combined with 8, 10 or 16 different sources. FIG. 2 shows an emission source device in a form of 10 line sources. Each emission source has a same length. Current directions diverge from a center to all directions, and included angles between adjacent emission sources are equal. Specifically, a multi-line source emitting device is arranged on the ground; the multi-line source emitting device consists of four pairs of grounding conductor sources with opposite current directions; through transmission lines, a grounding electrode and a magnetic sensor are put into the borehole, and a vertical electric field and magnetic field multi-components are observed in the borehole. One or more receiving magnetic probes and electrode pairs are arranged downward along the borehole, and the receiving magnetic probes and the electrode pairs are connected to a ground receiver. The ground receiver controls the receiving magnetic probes and the electrode pairs and collects received signals.

As shown in FIG. 1, the multi-line source ground-borehole transient electromagnetic detection method in an embodiment of the application includes following steps.

S1, constructing a multi-line source ground-borehole transient electromagnetic forward model.

when an electromagnetic field is excited in a layered earth surface and received in a borehole, an electromagnetic field component excited by a single grounding conductor source in an x-direction is expressed as follows:

$$E_x = -\frac{\hat{z}_0 I}{4\pi} \int_{-L}^{L} \int_0^\infty (1+r_{TE}) \frac{\lambda}{u_0} e^{u_0 z} J_0(\lambda r) d\lambda dx' - \frac{I}{4\pi} \left[\frac{x}{r} \int_0^\infty \left[(1-r_{TM})\frac{u_0}{\hat{y}_0} - (1+r_{TE})\frac{\hat{z}_0}{u_0}\right] e^{u_0 z} J_1(\lambda r) d\lambda \right]_{R_1}^{R_2} \quad (1)$$

$$E_y = -\frac{I}{4\pi} \left[\frac{y}{r} \int_0^\infty \left[(1-r_{TM})\frac{u_0}{\hat{y}_0} - (1+r_{TE})\frac{\hat{z}_0}{u_0}\right] e^{u_0 z} J_1(\lambda r) d\lambda \right]_{R_1}^{R_2}$$

$$E_z = -\frac{I}{4\pi} \left[\int_0^\infty (1-r_{TM}) \frac{\lambda}{u_0} e^{u_0 z} J_0(\lambda r) d\lambda \right]_{R_1}^{R_2}$$

$$H_x = -\frac{I}{4\pi} \frac{y}{r} \int_0^\infty (r_{TM} + r_{TE}) e^{u_0 z} J_1(\lambda r) d\lambda \Big|_{R_1}^{R_2}$$

$$H_y = -\frac{I}{4\pi} \frac{x}{r} \int_0^\infty (r_{TM} + r_{TE}) e^{u_0 z} J_1(\lambda r) d\lambda \Big|_{R_1}^{R_2} - \frac{I}{4\pi} \int_{-L}^{L} \int_0^\infty (1-r_{TE}) e^{u_0 z} \lambda J_0(\lambda r) d\lambda dx'$$

$$H_z = \frac{I}{4\pi} \int_{-L}^{L} \frac{y}{r} \int_0^\infty (1+r_{TE}) e^{u_0 z} \frac{\lambda^2}{u_0} J_1(\lambda r) d\lambda dx';$$

where, $J_1(\lambda r)$ and $J_0(\lambda r)$ are first-order and zero-order Bessel functions, respectively, $\lambda$ represents a horizontal wave number, $r_i$ represents receiving and sending distances of measuring points in coordinate systems to which different line sources belong; $h_j$ represents a thickness of a j-th layer; $\hat{z}_j$ represents an impedance of the j-th layer, $\hat{y}_j$ represents an admittance of the j-th layer, and z represents a height of a receiving point;

$$r_{TE} = \frac{Y_0 - \hat{Y}_1}{Y_0 + \hat{Y}_1}$$

indicates a reflection coefficient of an electromagnetic wave when an electric field component is incident on a plane, $$r_{TM} = \frac{Z_0 - \hat{Z}_1}{Z_0 + \hat{Z}_1}$$

indicates the reflection coefficient of the electromagnetic wave when a vertical magnetic field is incident on the plane, $$Y_0 = \frac{u_0}{\hat{z}_0}$$

indicates an intrinsic admittance of a free space, $\hat{Y}_1$ indicates a surface admittance, $$Z_0 = \frac{u_0}{\hat{y}_0}$$

indicates an intrinsic impedance of the free space, and $\hat{Z}_1$ indicates a surface impedance, where $\hat{z}_0 = i\omega\mu_0$ and $\hat{y}_0 = i\omega\varepsilon_0$; $\omega$ represents an angular frequency, i represents a complex number, $\varepsilon_0$ represents a dielectric coefficient of an underground uniform half space, and $\mu_0$ represents a magnetic permeability of the underground uniform half space.

Figure 3:
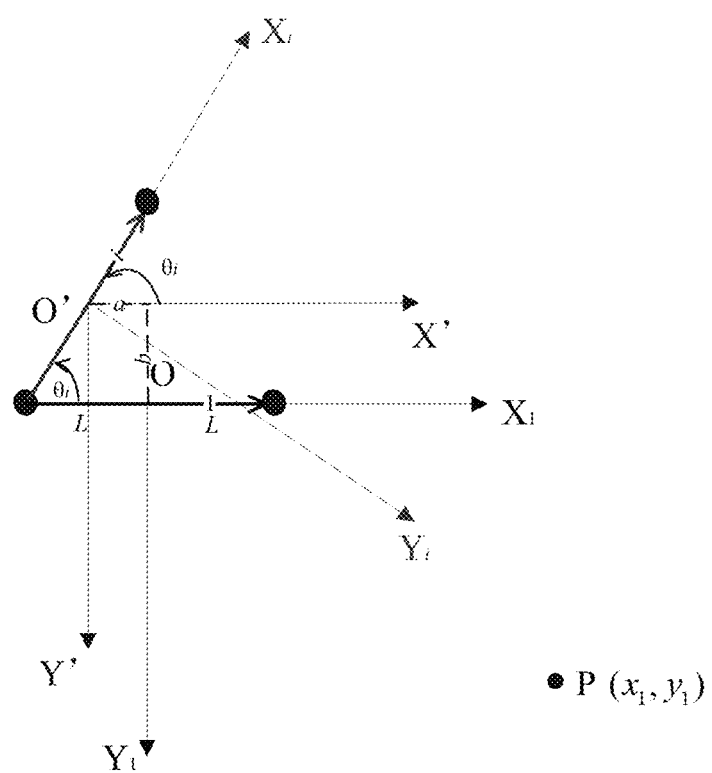
FIG. 3 is a schematic diagram of a coordinate transformation relationship between different sources.
Figure 4A:
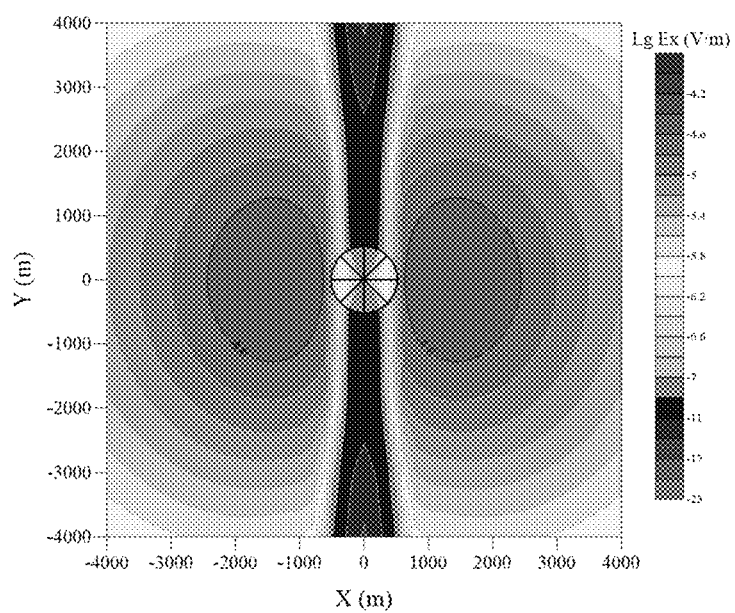
Figure 4B:
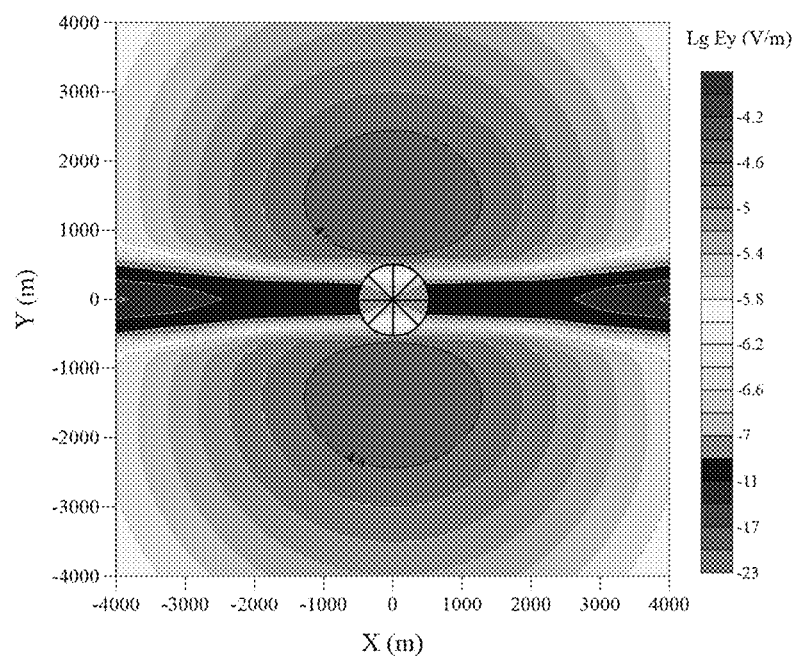
Figure 4C:
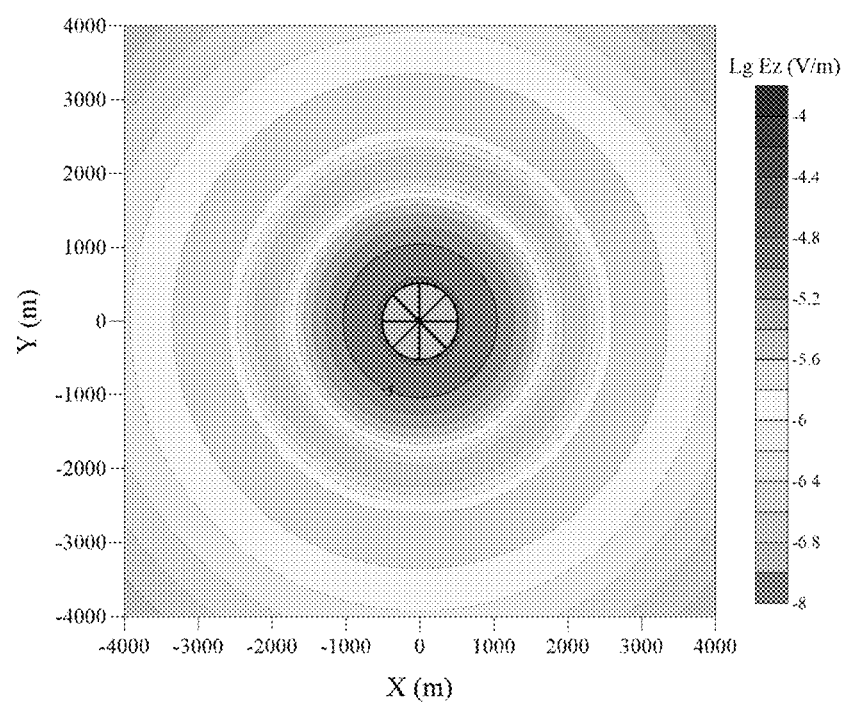
Figure 4D:
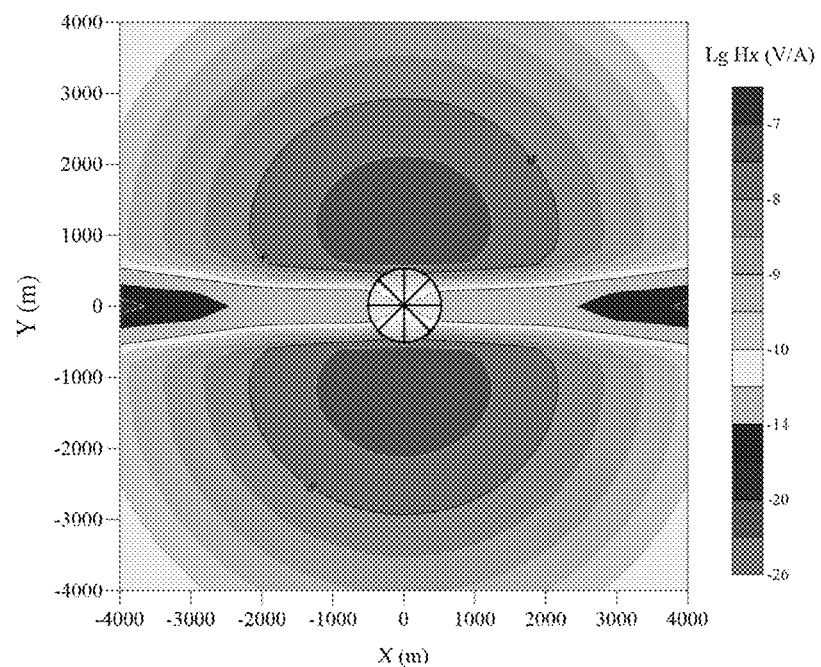
Figure 4E:
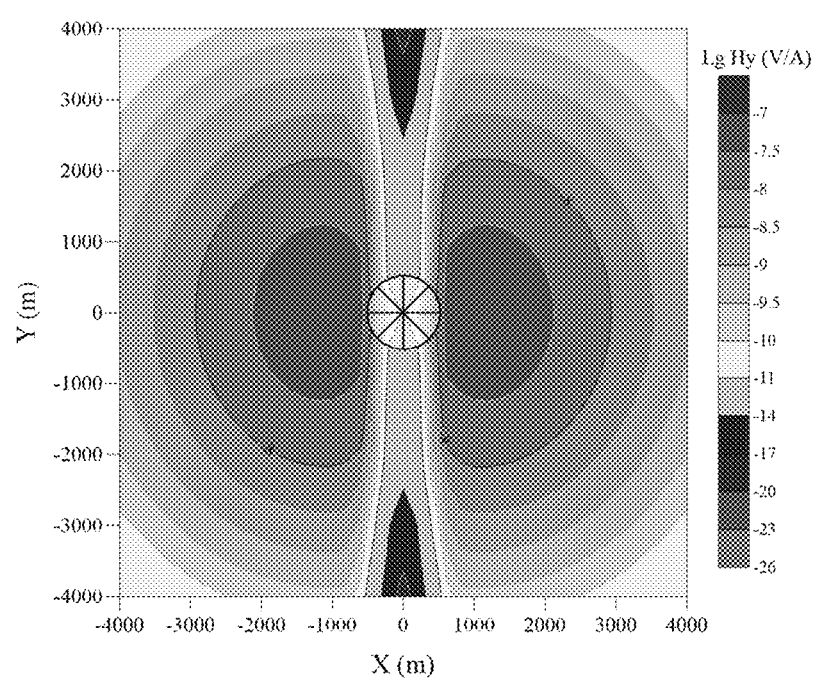
Figure 4F:
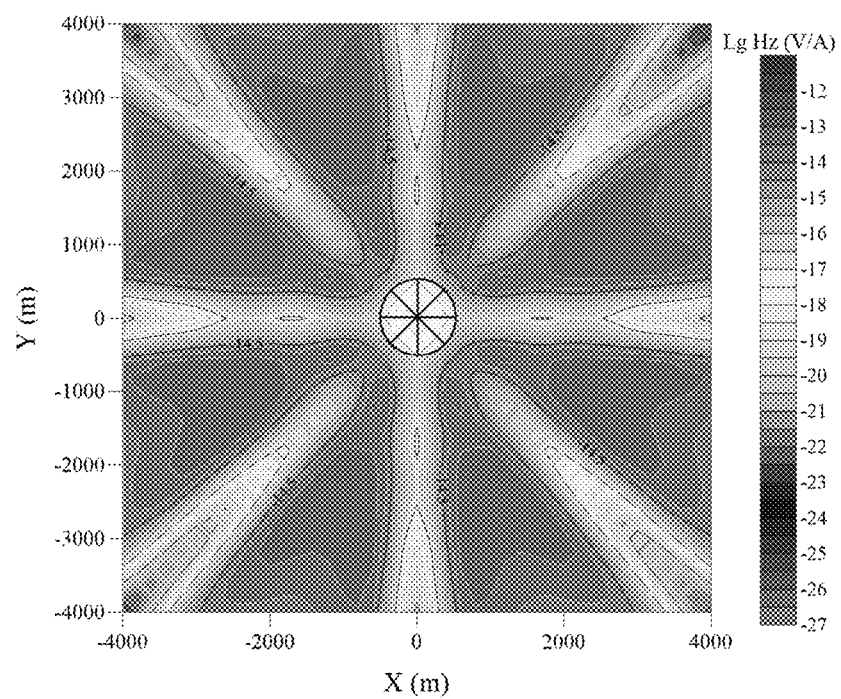
Figure 5A:
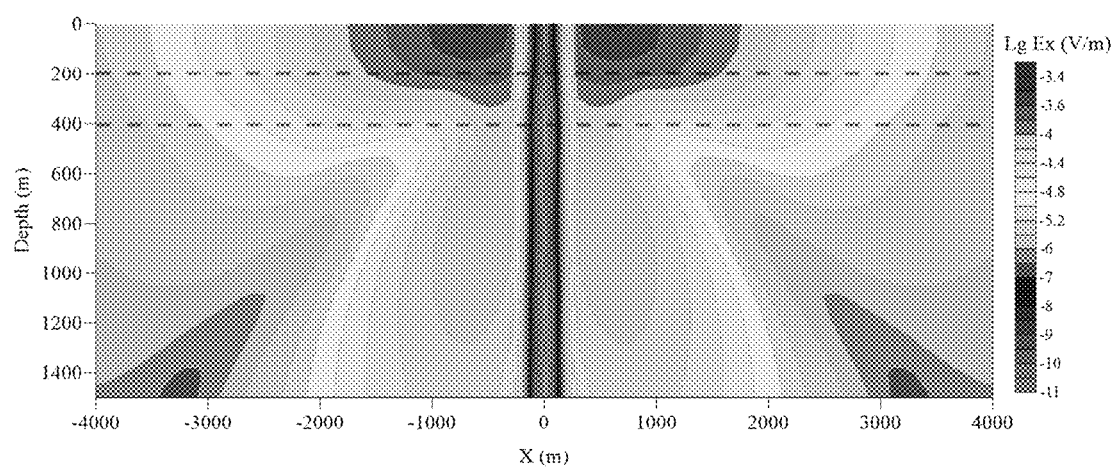
Figure 5B:
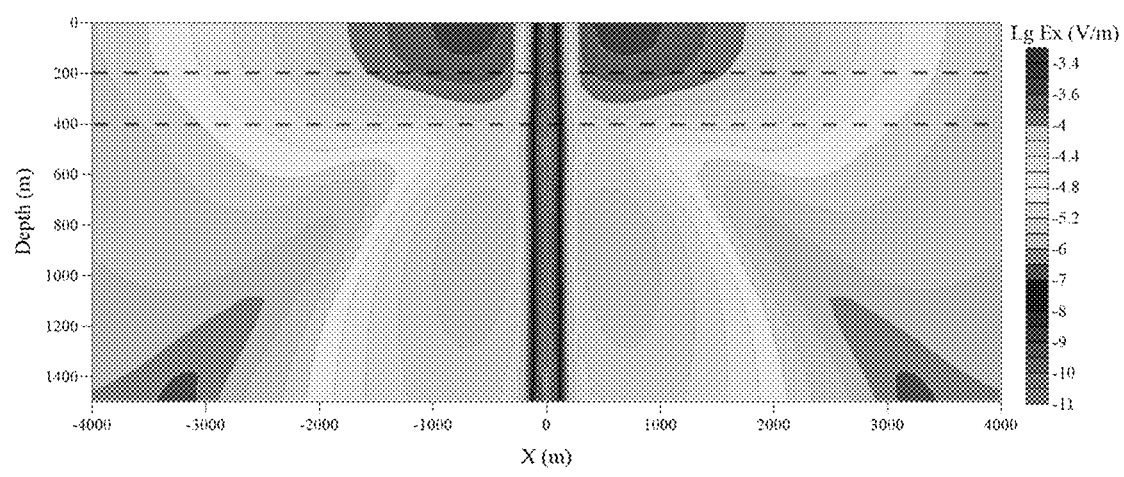
Figure 5C:
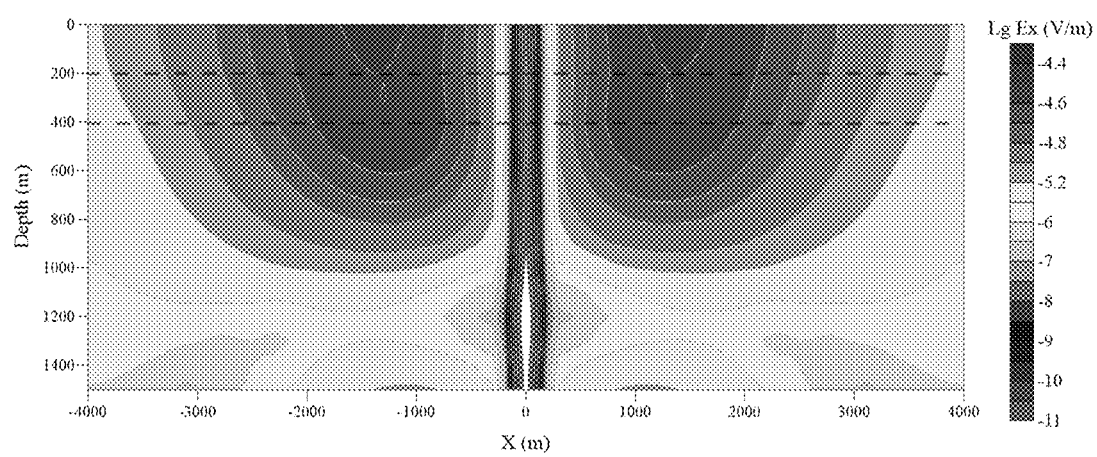
Figure 5D:
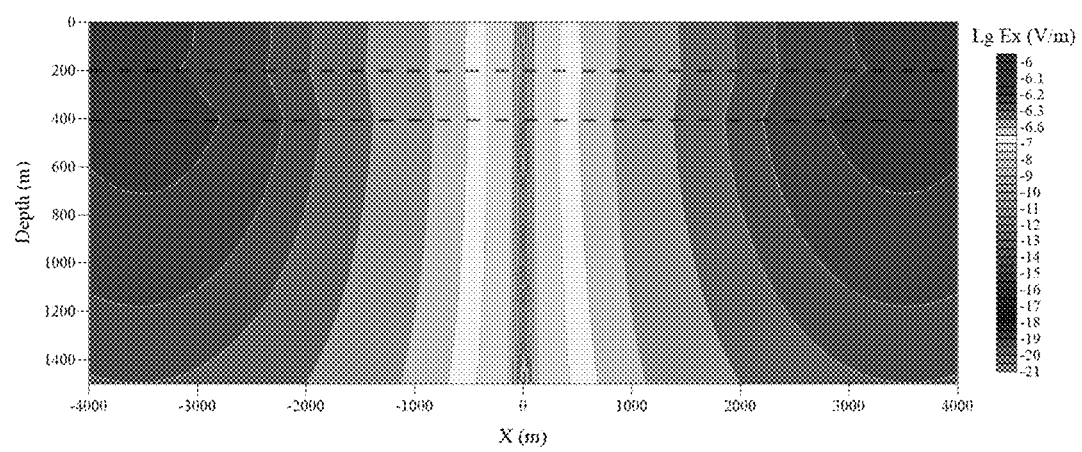
Figure 6A:
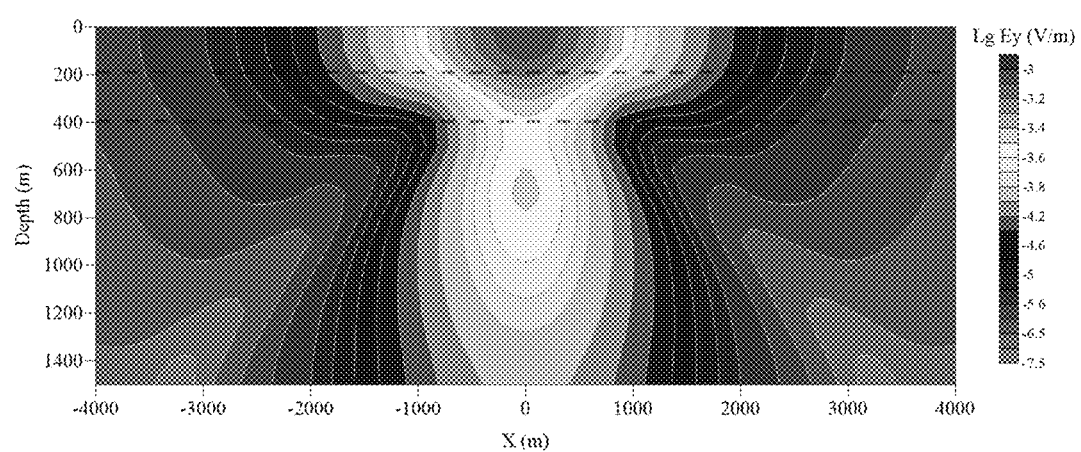
Figure 6B:
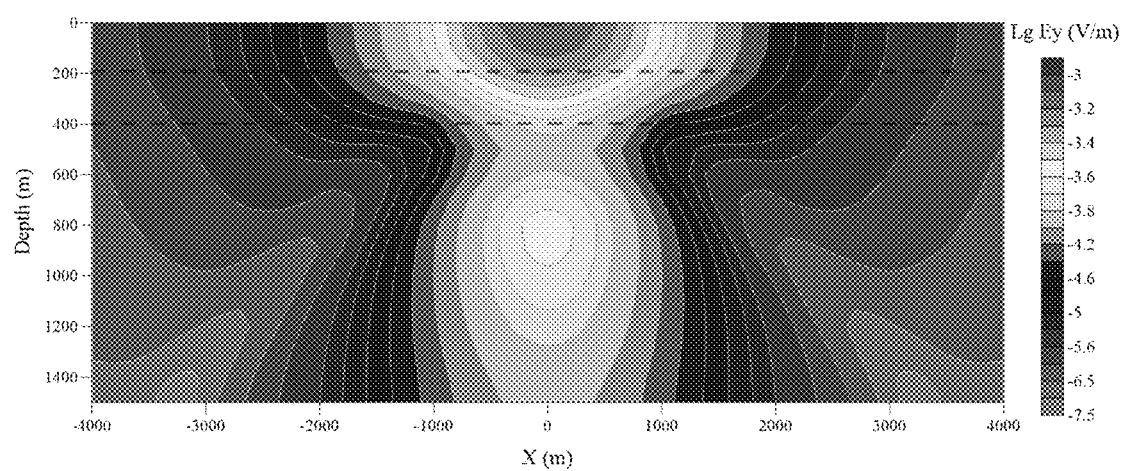
Figure 6C:
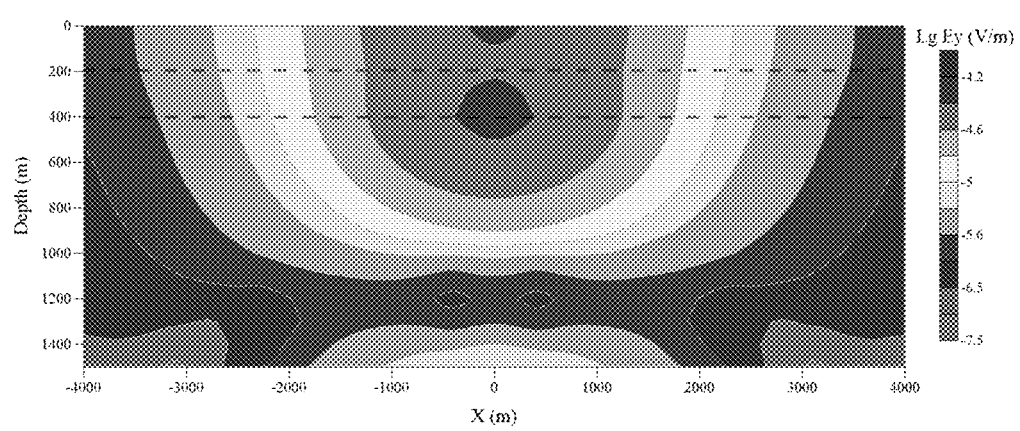
Figure 6D:
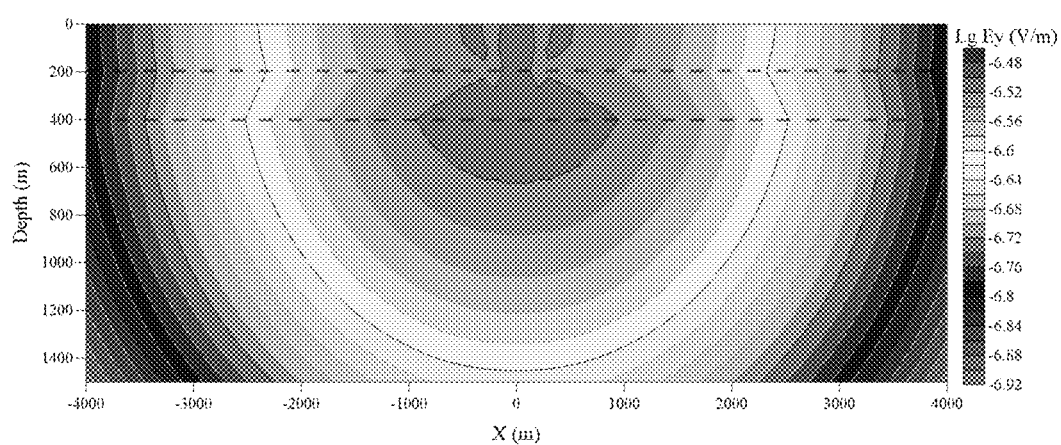
Figure 7A:
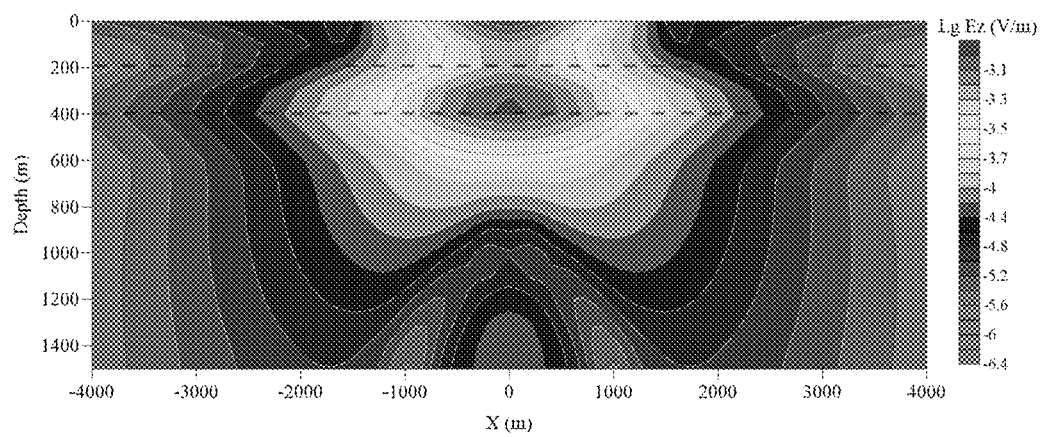
Figure 7B:
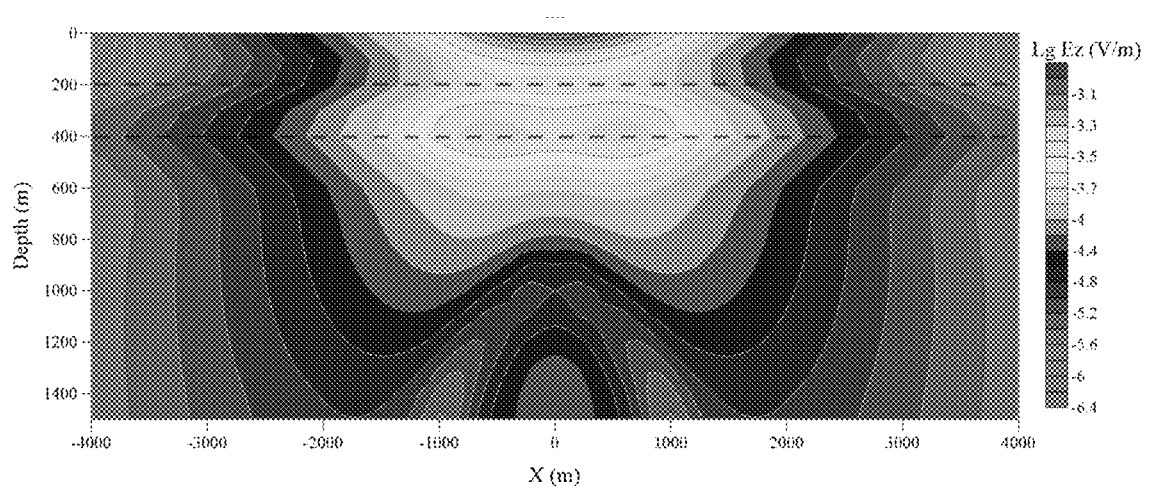
Figure 7C:
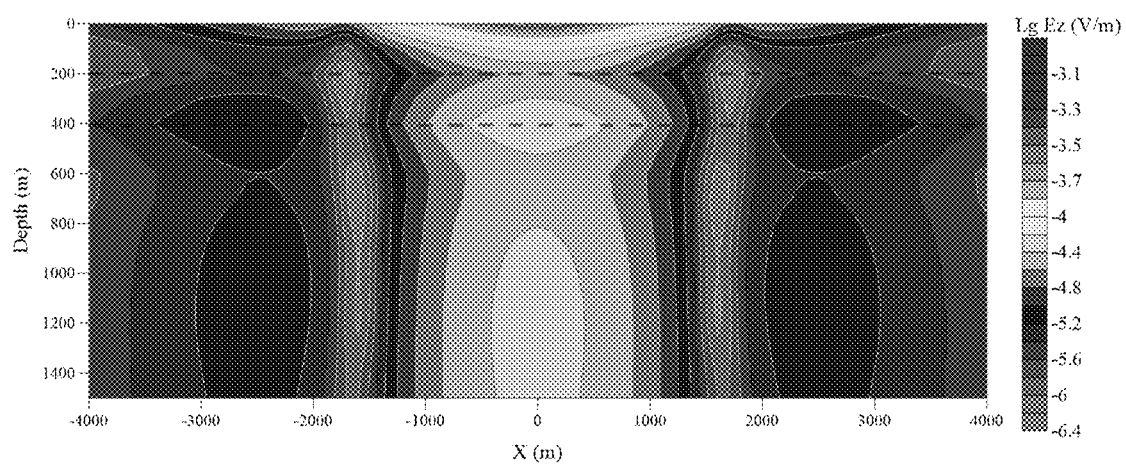
Figure 7D:
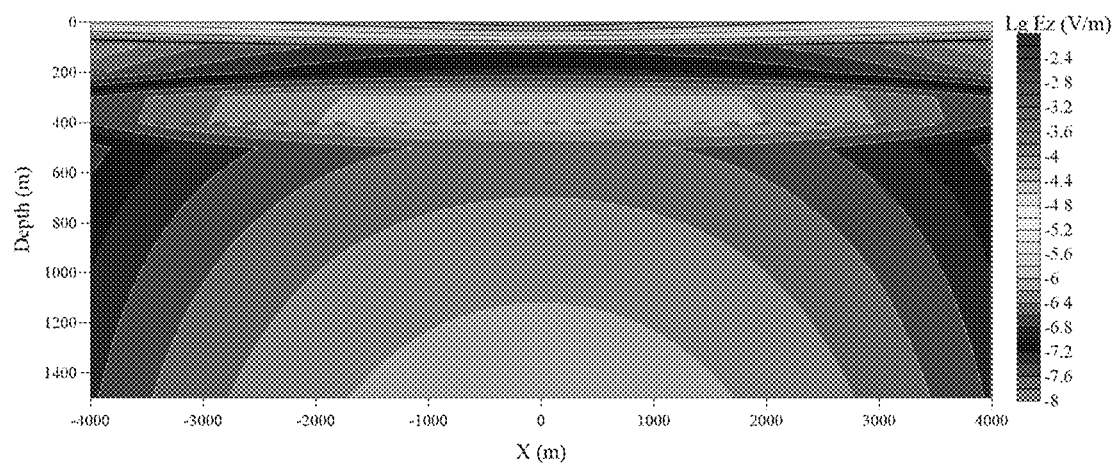

For a multi-line source ground-borehole transient electromagnetic field, z is positive; z is equal to 0 when observed on the ground, but negative when observed in the air. A solution of responses is obtained by a superposition calculation of the responses of various line sources, and the coordinate system is established with each line source as an x axis and a midpoint of each line source as a source point, as shown in FIG. 3:

for the same measuring point $P(x_1, y_1)$, coordinates in different coordinate systems are obtained by relationships between translations and rotations of the coordinate systems;

(e) when the coordinate system $X_1OY_1$ is translated to X'O'Y', the coordinate is:

$$x' = x_1 + a$$

$$y' = y_1 + b,$$

where $a = L - L \cos \theta_i$, $b = L \sin \theta_i$;

(f) when the coordinate system X'O'Y' is rotated to the coordinate system $X_iO'Y_i$ to which the i-th source belongs:

$$x_i = x' \cos \theta_i - y' \sin \theta_i$$

$$y_i = y' \cos \theta_i + x' \sin \theta_i,$$

each component of the magnetic field generated by a multi-line source excitation is obtained by a superposition.

S2, obtaining multi-line source ground-borehole transient electromagnetic responses of an underground target by the multi-line source ground-borehole transient electromagnetic forward model.

Taking eight line sources as an example, the included angle between adjacent line sources is 45 degrees, the length of each line source is 500 meters, and an emission current is 10 A. Multi-line source ground-borehole transient electromagnetic field responses are analyzed by the multi-line source ground-borehole transient electromagnetic forward model (K model), and depths of the receiving points are 100, 200, 300, 400 and 500 meters respectively. Geoelectric parameters of the K model are as follows:

$\rho_1 = 300$ $\Omega$m, $d_1 = 200$ m; $\rho_2 = 2000$ $\Omega$m, $d_2 = 200$ m; $\rho_3 = 500$ $\Omega$m.

Taking a source center as a coordinate origin and the line source 1 as an X axis, a planar distribution of multi-components of the electromagnetic field at the depth of 200 m underground is obtained through a calculation, as shown in FIG. 4.

As shown in FIGS. 4a-4f, horizontal electric fields Ex and Ey show a typical axisymmetric distribution, and their response distribution characteristics are similar. For the Ex, the response of the Ex is 0 at the measuring point where x=0, and similarly, for the Ey, the Ey is 0 at the measuring point where y=0. Their response distribution characteristics should be paid a special attention to in an actual observation. In these special positions, the responses of the actual observations are not zero, but the responses of an underground three-dimensional target. Similar response distribution characteristics also exist in the distribution of horizontal magnetic fields. For the Ez, the response distribution presents a centrosymmetric distribution law, and the responses are centered on the source. With an increase of an offset, the responses gradually decrease. Therefore, if the actual observation is made, try to observe in an area near the source. Compared with a horizontal component, a vertical magnetic field response value is much lower, so the calculated response may be ignored. This is because the vertical magnetic field itself is generated by the line sources, and a combination of the multi-line sources counteracts the vertical magnetic field generated by the line sources. Therefore, in a case of the layered earth, the vertical magnetic field response in a forward calculation is ignored, but a response amplitude is not weak in the actual observation. The response amplitude is generated by the underground three-dimensional target. The observation of the vertical magnetic field realizes a real three-dimensional response observation, while ignoring a background field of the layered earth.

S3, recognizing an underground target layer according to electromagnetic diffusion characteristics of the multi-line source ground-borehole transient electromagnetic responses.

A greatest advantage of the multi-line sources is that a fine detection of high resistance targets is realized by observing electric field components, so in a ground-borehole transient electromagnetic observation, the application focuses on observing reflection characteristics of underground electric field components to a high resistance. In order to analyze a detection capability of the observed electric field component in the borehole to a high resistance target layer, response profiles of the high resistance target layer at different times are analyzed. The resolution and the recognition capability of an underground high resistance layer are judged by analyzing response diffusion properties of the underground target layer.

As shown in FIGS. 5a-5e, FIGS. 6a-6e and FIGS. 7a-7d, for the high resistance layer with the depth of 200-400 m, an Ez component shows an obvious response indication function, and a maximum isoline trap coincides with a top and a bottom of the high resistance layer, so that position information and thickness information of the high resistance layer are well reflected, indicating that the vertical electric field component of the transient electromagnetic field in the ground-borehole has a good resolution for the high resistance target.

A similar characteristic appears in an Ey component diffusion profile, but a difference is that this indicator characteristic only appears after a certain time, and only in a limited number of the measuring points and when an axial observation is satisfactory relative to the source. When the electric field is observed in the borehole, the vertical electric field should be selected as far as possible; when the electric field is not observed in a roadway, an axial electric field component and the vertical electric field component of the source are considered.

The application also provides a multi-line source ground-borehole transient electromagnetic detection device, including:

a construction module, which is used for constructing the multi-line source ground-borehole transient electromagnetic forward model;

an analysis module, which is used for obtaining the multi-line source ground-borehole transient electromagnetic responses of the underground target layer through the multi-line source ground-borehole transient electromagnetic forward model; and a recognition module, which is used for recognizing the underground target layer according to the electromagnetic diffusion characteristics of the multi-line source ground-borehole transient electromagnetic responses.

The application has the following advantages.

In order to solve shortcomings of the ground-borehole transient electromagnetic method in detecting high resistance targets, the application provides a ground-borehole transient electromagnetic detection method based on a plurality of ground emission sources. The application analyzes distribution characteristics of various components of the multi-line source ground-borehole transient electromagnetic field and the resolution of an electrical structure, and proposes to realize a more precise recognition of underground high resistance target information by using the vertical electric field component of a pure transverse magnetic field and the horizontal electric field in some areas, so as to further improve the detection capability of the ground-borehole transient electromagnetic method for the high resistance targets.

Obviously, those skilled in the art may make various changes and modifications to the application without departing from a spirit and a scope of the application. It should be noted that the above description is only a specific embodiment of the application, and does not limit the application. Any modulation and optimization within the spirit and a principle of the application should be covered by the claims of application.

What is claimed is:

1. A multi-line source ground-borehole transient electromagnetic detection method for detecting metal mineral resources and geothermal resources, comprising:

S1, constructing a multi-line source ground-borehole transient electromagnetic forward model using a multi-line source emitting device arranged on the ground, consisting of four pairs of grounding conductor sources with opposite current directions, and through transmission lines, a grounding electrode and a magnetic sensor are inserted into the borehole to observe vertical electric and magnetic field multi-components;

S2, obtaining multi-line source ground-borehole transient electromagnetic responses of an underground target layer using one or more receiving magnetic probes and electrode pairs arranged downward along the borehole, with the receiving magnetic probes and electrode pairs connected to a ground receiver controlling them and collecting received signals; and S3, recognizing the underground target layer according to electromagnetic diffusion characteristics of the multi-line source ground-borehole transient electromagnetic responses;

wherein the S1 is specifically as follows:

when an electromagnetic field is excited in a layered earth surface and received in a borehole, an electromagnetic field component excited by a single grounding conductor source in an x-direction is expressed as follows:

$$E_x = -\frac{\hat{z}_0 I}{4\pi} \int_{-L}^{L} \int_0^\infty (1+r_{TE})\frac{\lambda}{u_0} e^{u_0 z} J_0(\lambda r) d\lambda dx' - \tag{1}$$

$$\frac{I}{4\pi}\left[\frac{x}{r}\int_0^\infty \left[(1-r_{TM})\frac{u_0}{\hat{y}_0} - (1+r_{TE})\frac{\hat{z}_0}{u_0}\right]e^{u_0 z} J_1(\lambda r) d\lambda\right]_{R_1}^{R_2}$$

$$E_y = -\frac{I}{4\pi}\left[\frac{y}{r}\int_0^\infty \left[(1-r_{TM})\frac{u_0}{\hat{y}_0} - (1+r_{TE})\frac{\hat{z}_0}{u_0}\right]e^{u_0 z} J_1(\lambda r) d\lambda\right]_{R_1}^{R_2}$$

$$E_z = -\frac{I}{4\pi}\left[\int_0^\infty (1-r_{TM})\frac{\lambda}{u_0} e^{u_0 z} J_0(\lambda r) d\lambda\right]_{R_1}^{R_2}$$

$$H_x = -\frac{I}{4\pi}\frac{y}{r}\int_0^\infty (r_{TM}+r_{TE}) e^{u_0 z} J_1(\lambda r) d\lambda \Big|_{R_1}^{R_2}$$

$$H_y = -\frac{I}{4\pi}\frac{x}{r}\int_0^\infty (r_{TM}+r_{TE}) e^{u_0 z} J_1(\lambda r) d\lambda \Big|_{R_1}^{R_2} -$$

$$\frac{I}{4\pi}\int_{-L}^{L}\int_0^\infty (1-r_{TE}) e^{u_0 z} \lambda J_0(\lambda r) d\lambda dx'$$

$$H_z = \frac{I}{4\pi}\int_{-L}^{L}\frac{y}{r}\int_0^\infty (1+r_{TE}) e^{u_0 z} \frac{\lambda^2}{u_0} J_1(\lambda r) d\lambda dx',$$

wherein I represents an emission current, $R_1$ and $R_2$ represent distances between two grounding electrodes and a receiving point, $J_1(\lambda r)$ and $J_0(\lambda r)$ are first-order and zero-order Bessel functions, respectively, $\lambda$ represents a horizontal wave number, $r_i$ represents receiving and sending distances of measuring points in coordinate systems to which different line sources belong; $\hat{z}_j$ represents an impedance of the j-th layer, $\hat{y}_j$ represents an admittance of the j-th layer, and z represents a height of the receiving point;

$$r_{TE} = \frac{Y_0 - \hat{Y}_1}{Y_0 + \hat{Y}_1}$$

indicates a reflection coefficient of an electromagnetic wave when an electric field component is incident on a plane, $$r_{TM} = \frac{Z_0 - \hat{Z}_1}{Z_0 + \hat{Z}_1}$$

indicates the reflection coefficient of the electromagnetic wave when a vertical magnetic field is incident on the plane, $$Y_0 = \frac{u_0}{\hat{z}_0}$$

indicates an intrinsic admittance of a free space, $\hat{Y}_1$ indicates a surface admittance, $$Z_0 = \frac{u_0}{\hat{y}_0}$$

indicates an intrinsic impedance of the free space, and $\hat{Z}_1$ indicates a surface impedance, where $\hat{z}_0 = i\omega\mu_0$ and $\hat{y}_0 = i\omega\varepsilon_0$; $\omega$ represents an angular frequency, i represents a complex number, $\varepsilon_0$ represents a dielectric coefficient of an underground uniform half space, and $\mu_0$ represents a magnetic permeability of the underground uniform half space;

for a multi-line source ground-borehole transient electromagnetic field, z is positive; z is equal to 0 when observed on the ground, but negative when observed in the air; a solution of the responses is obtained by a superposition calculation of the responses of various line sources; $E_X$, $E_Y$, $E_Z$, $H_X$, $H_Y$, and $H_Z$ represent electric field components and magnetic field components in an x direction, a y direction, and a z direction respectively.

2. The multi-line source ground-borehole transient electromagnetic detection method for detecting metal mineral resources and geothermal resources according to claim 1, wherein in the S2, the multi-line source ground-borehole transient electromagnetic responses in the underground target layer are obtained by designing following parameters: eight line sources are set, an included angle between adjacent line sources is 45 degrees, a length of each line source is set to 500 meters, an emission current is 10 A, and depths of receiving points are 100, 200, 300, 400 and 500 meters respectively.

3. The multi-line source ground-borehole transient electromagnetic detection method for detecting metal mineral resources and geothermal resources according to claim 1, wherein in the S1, a coordinate system is established with each line source as an x axis and a midpoint of each line source as a source point;

for the same measuring point $P(x_1,y_1)$, coordinates in different coordinate systems are obtained by relationships between translations and rotations of the coordinate systems;

(a) when the coordinate system $X_1OY_1$ is translated to $X'O'Y'$, the coordinates are:

$x'=x_1+a$ $y'=y_1+b$, wherein $a=L-L\cos\theta_i$, $b=L\sin\theta_i$;

(b) when the coordinate system $X'O'Y'$ is rotated to the coordinate system $X_iO'Y_i$ to which the i-th source belongs:

$x_i=x'\cos\theta_i-y'\sin\theta_i$ $y_i=y'\cos\theta_i+x'\sin\theta_i$, each component of the magnetic field generated by a multi-line source excitation is obtained by the superposition.

4. The multi-line source ground-borehole transient electromagnetic detection method for detecting metal mineral resources and geothermal resources as claimed in claim 1, wherein in the S3, a resolution and a recognition capability of an underground high resistance layer are determined based on the response diffusion properties of the underground target layer.

* * * * *